No. 763,356. PATENTED JUNE 28, 1904.
G. BRABROOK.
KNIFE.
APPLICATION FILED SEPT. 19, 1903.
NO MODEL.
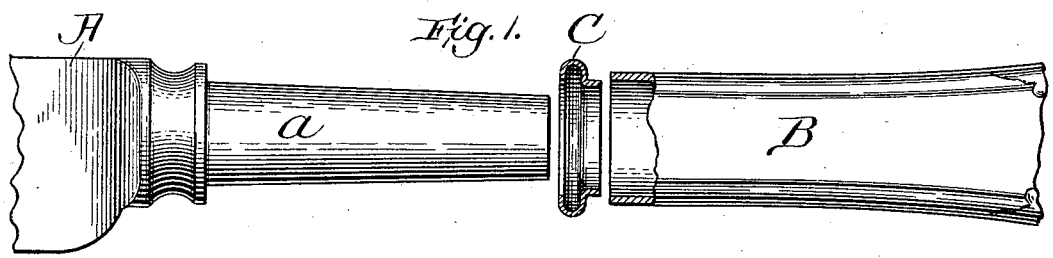
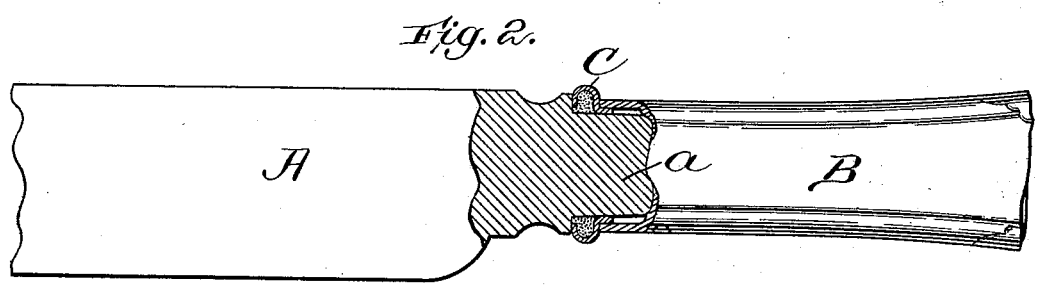
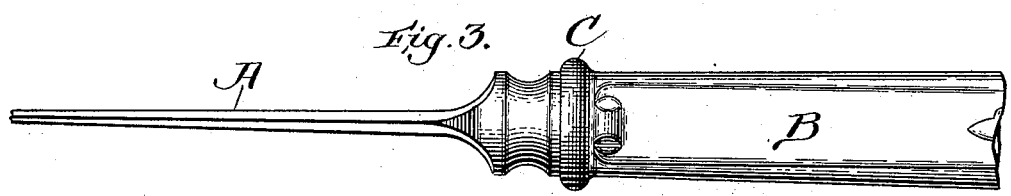
Witnesses:
Arthur F. Randall
Josephine H. Ryan
Inventor:
George Brabrook,
by Roberts & Mitchell,
Attorneys.

No. 763,356. Patented June 28, 1904.

UNITED STATES PATENT OFFICE.

GEORGE BRABROOK, OF TAUNTON, MASSACHUSETTS, ASSIGNOR TO REED & BARTON CORPORATION, OF TAUNTON, MASSACHUSETTS, A CORPORATION OF MASSACHUSETTS.

KNIFE.

SPECIFICATION forming part of Letters Patent No. 763,356, dated June 28, 1904.

Application filed September 19, 1903. Serial No. 173,906. (No model.)

*To all whom it may concern:*

Be it known that I, GEORGE BRABROOK, a citizen of the United States, and a resident of Taunton, in the county of Bristol and State of Massachusetts, have invented new and useful Improvements in Knives, of which the following is a specification.

My invention relates to cutlery, particularly plated ware, and has in view to provide an improved article of this class.

Ordinary silver-plated knife-blades are almost invariably made with a raised portion or bolster at or near the point where the handle joins the blade, which serves to hold the blade clear of a table or the like when the knife lies thereon, the handle being weighted, so as to be heavier than the blade. In the case of that class of knives wherein the handle and the blade are integral this raised portion is an integral part of the structure; but in the case of that class of knives wherein the handle is hollow and is fastened to a shank on the blade extending into the handle this raised portion is sometimes integral with the blade and sometimes integral with the handle; but in all three cases it is the part of the knife which is subjected to the most wear and hard usage and the part, therefore, which first loses its plating of silver. The wearing away of the plating on the bolster of the ordinary knife occurs long before the plating starts to show wear at any other point and has always been a most conspicuous and objectionable defect in plated ware of this class, as all familiar with this art know.

The object of my invention is to obviate this defect and to produce a knife of otherwise improved structure and increased durability and one which will better retain its finish and appearance without defacement under the ordinary conditions of wear.

My improved article of cutlery comprises a shielding portion which projects beyond the silver-plated portions of the article and which is made from a separate piece of silver or alloy of silver fastened to the article. Herein I have shown my invention embodied in an all-metal knife having its handle plated and blade either plated or unplated, as usual, the projecting shielding portion being located near the junction of the handle and the blade and made from a piece of silver or an alloy of silver fastened in place in any suitable manner; but preferably the handle is hollow and fastened on the shank of the blade, while the shield is a ferrule of silver or an alloy of silver brazed to the end of the hollow handle.

Other novel features are hereinafter pointed out.

In the accompanying drawings, Figure 1 is an elevation, partly in section, of one form of my invention, showing the parts before they are assembled. Fig. 2 is a like view, but showing the parts assembled and fastened together. Fig. 3 is an edge view of the knife shown in Fig. 2.

Herein I have shown my invention embodied in a table-knife comprising a silver-plated or unplated blade A, having a shank *a*, adapted to be fastened within a hollow silver-plated metal handle B. At the base of the blade A and separating the blade proper from the shank is a shoulder, against which the inturned lip of the ferrule C, hereinafter described, abuts when the parts are assembled as shown in Fig. 2. Soldered or otherwise fastened to the open end of the handle B is a metal ring or ferrule C, which is peculiar in that it is not of the same metal as the blade A or the handle B, but is a solid piece of silver or silver alloy, and therefore is of a structure different from both the handle and the blade. The ferrule C is made of sheet metal and has a flange which extends within the end of the hollow handle B and is suitably secured to the interior of the handle, thus providing a strong but very neat and substantially invisible union between the two. The ferrule C also has the annular projection, as shown in the drawings, which constitutes the guard or shield proper for taking the wear. This projection is inturned at its edge, forming a lip against which the shoulder of the blade abuts, thus not only giving the junction between the blade and the handle strength and support, but providing a handsome finish